United States Patent [19]

Nygaard

[11] Patent Number: 5,713,394

[45] Date of Patent: Feb. 3, 1998

[54] REUSABLE INSULATION JACKET FOR TUBING

[76] Inventor: Noble A. Nygaard, 1067 Coulee Trail, Roberts, Wis. 54023

[21] Appl. No.: 611,184

[22] Filed: Mar. 5, 1996

Related U.S. Application Data

[63] Continuation-in-part of Ser. No. 68,384, May 28, 1993, Pat. No. 5,503,193, and a continuation-in-part of Ser. No. 99,943, Jul. 30, 1993, abandoned.

[51] Int. Cl.$^6$ ........................................... F16L 9/14
[52] U.S. Cl. ........................... 138/149; 137/375; 138/110
[58] Field of Search ..................................... 138/103, 108, 138/109, 110, 128, 147, 149, 156, 177, 178; 137/375

[56] References Cited

U.S. PATENT DOCUMENTS

| | | |
|---|---|---|
| 397,822 | 2/1889 | Suhr . |
| 2,070,861 | 2/1937 | Gillies . |
| 2,545,030 | 3/1951 | Isenberg et al. . |
| 2,695,254 | 11/1954 | Isenberg . |
| 2,872,947 | 2/1959 | Isenberg . |
| 3,237,796 | 3/1966 | Callahan . |
| 3,724,491 | 4/1973 | Knudsen et al. . |
| 3,929,167 | 12/1975 | Bickel . |
| 3,941,159 | 3/1976 | Toll . |
| 4,046,406 | 9/1977 | Press et al. . |
| 4,095,937 | 6/1978 | Colburn et al. . |
| 4,112,967 | 9/1978 | Withem . |
| 4,142,565 | 3/1979 | Plunkett . |
| 4,181,157 | 1/1980 | DeCamp . |
| 4,207,918 | 6/1980 | Burns et al. . |
| 4,218,814 | 8/1980 | Hodapp . |
| 4,415,184 | 11/1983 | Stephenson et al. . |
| 4,556,082 | 12/1985 | Riley et al. . |
| 4,590,108 | 5/1986 | Nippe . |
| 4,735,235 | 4/1988 | Anderson et al. . |
| 4,807,669 | 2/1989 | Prestidge . |
| 4,930,543 | 6/1990 | Zuiches . |
| 4,944,973 | 7/1990 | Follette . |
| 4,985,942 | 1/1991 | Shaw . |
| 5,025,836 | 6/1991 | Botsolas . |
| 5,055,334 | 10/1991 | Lechuga . |
| 5,099,889 | 3/1992 | Ratzlaff . |
| 5,112,661 | 5/1992 | Pendergraft et al. . |
| 5,503,193 | 4/1996 | Nygaard ................................. 138/149 |
| 5,522,433 | 6/1996 | Nygaard ................................. 138/149 |

FOREIGN PATENT DOCUMENTS 116651  10/1929  Austria .

*Primary Examiner*—Stephen F. Gerrity
*Attorney, Agent, or Firm*—Palmatier, Sjoquist, Helget & Voigt, P.A.

[57] ABSTRACT

A reusable single layer insulation jacket for splicing and termination of industrial tubing, fittings and valves carrying extreme hot and cold materials comprises a fiberglass mat. The mat is of a width as to completely wrap the tubing, fitting or valve and overlap itself whereat complementary releasable fastening means securely hold the mat in place to insulate the tubing, fitting or valve from fire and to prevent an individual from otherwise being burned from contacting the tubing, fitting or valve.

16 Claims, 8 Drawing Sheets

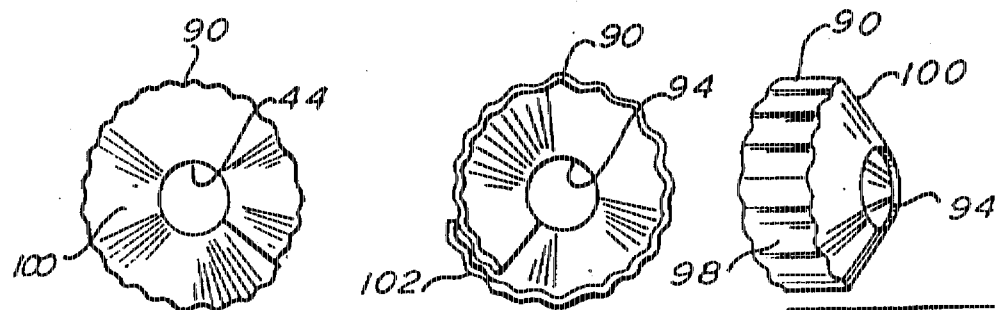
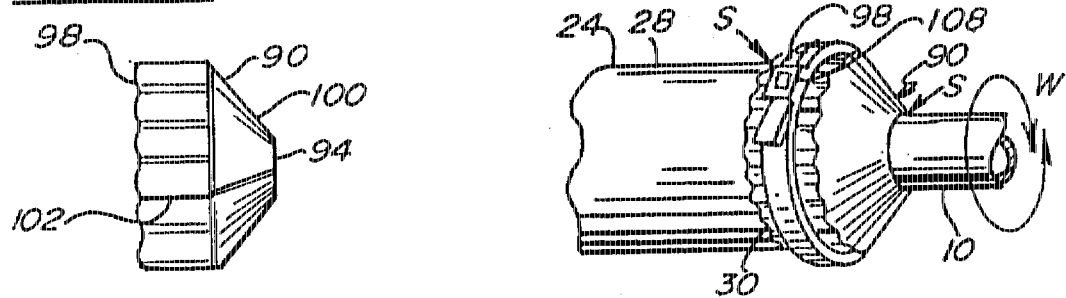
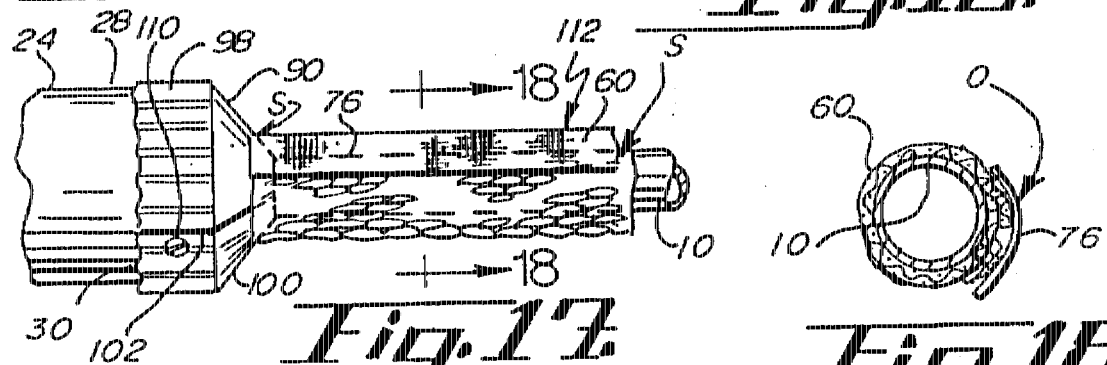
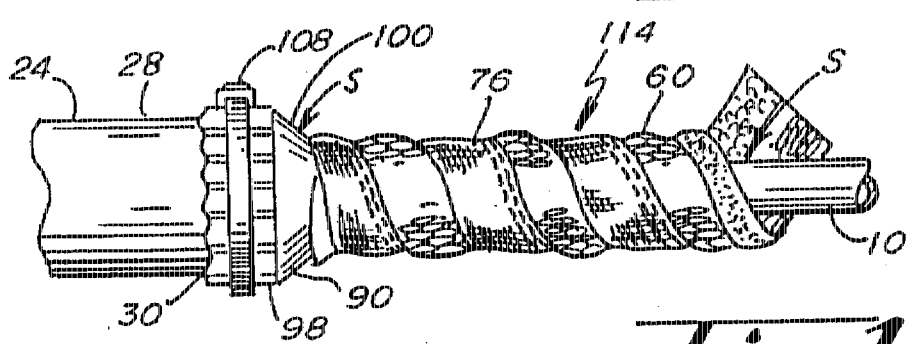

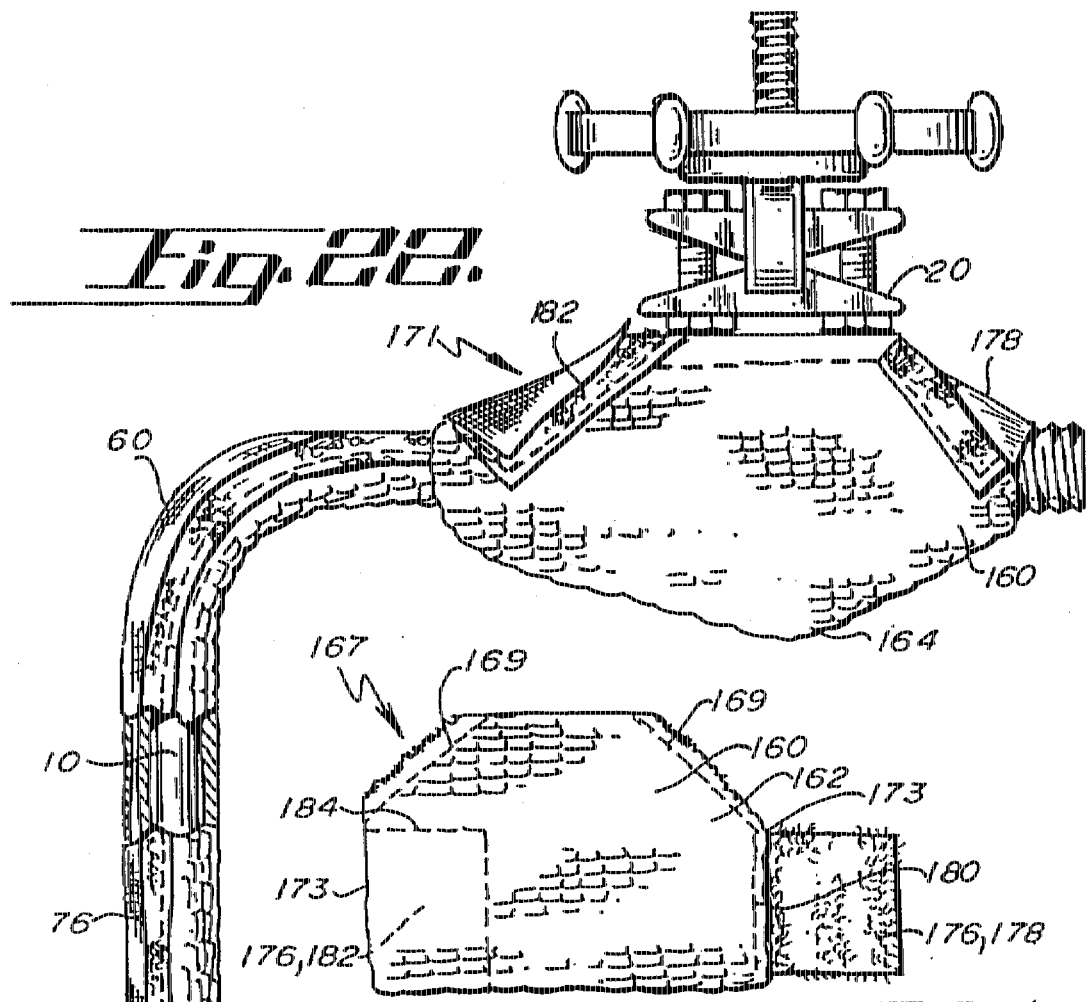
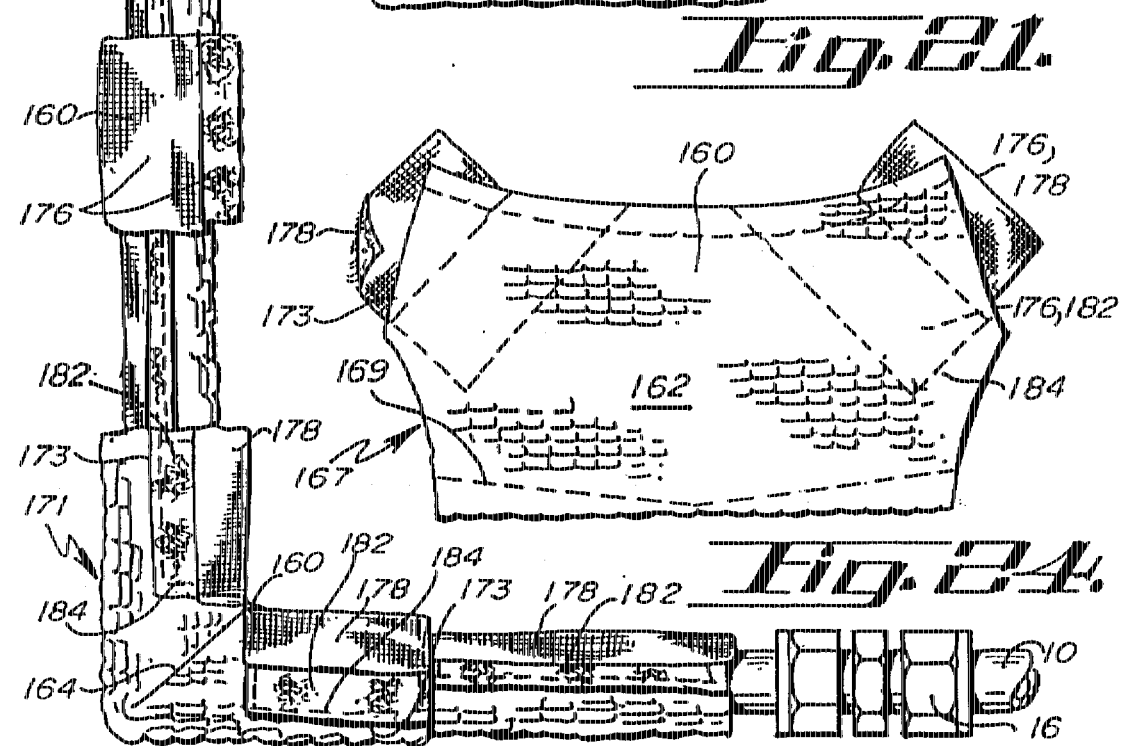

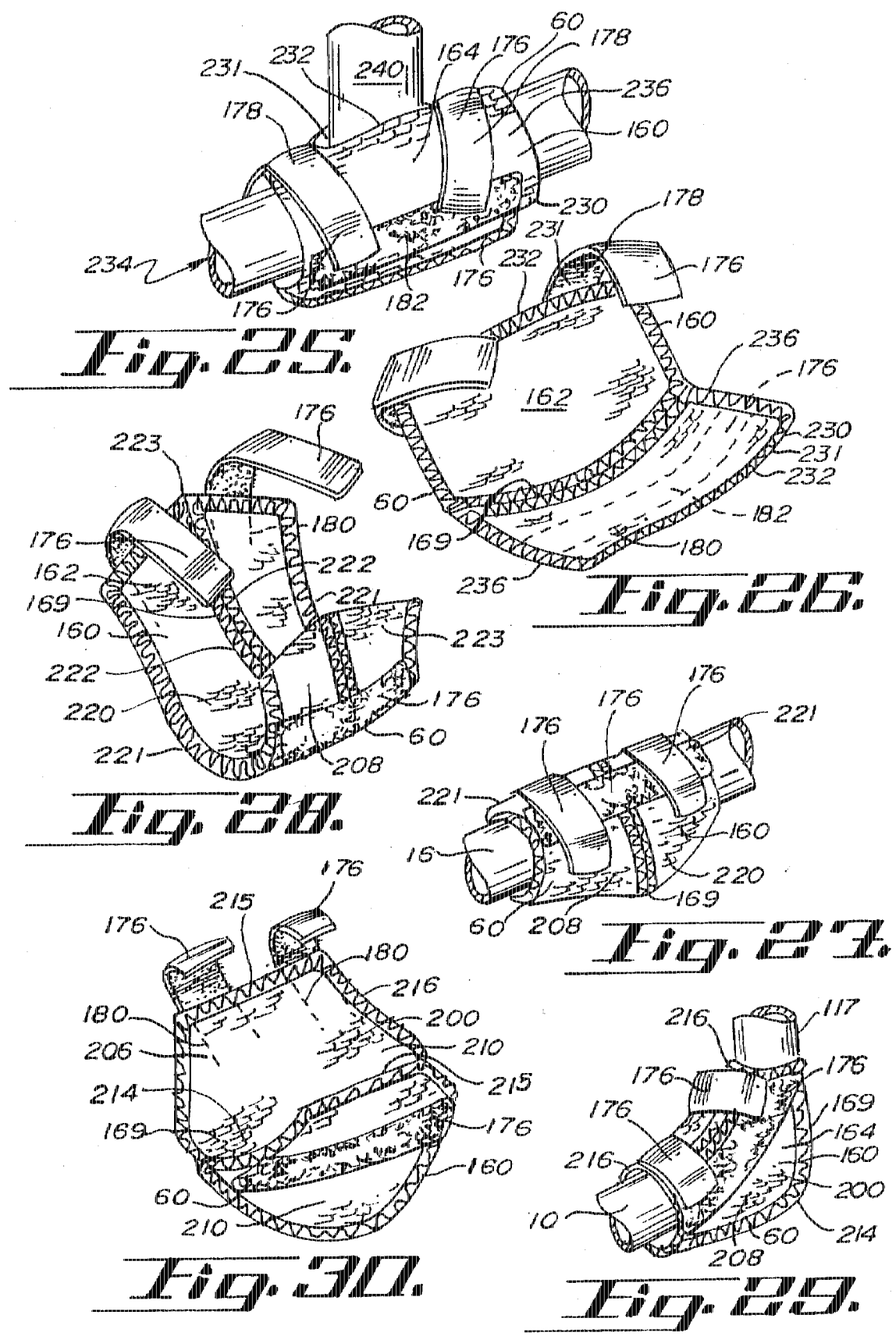

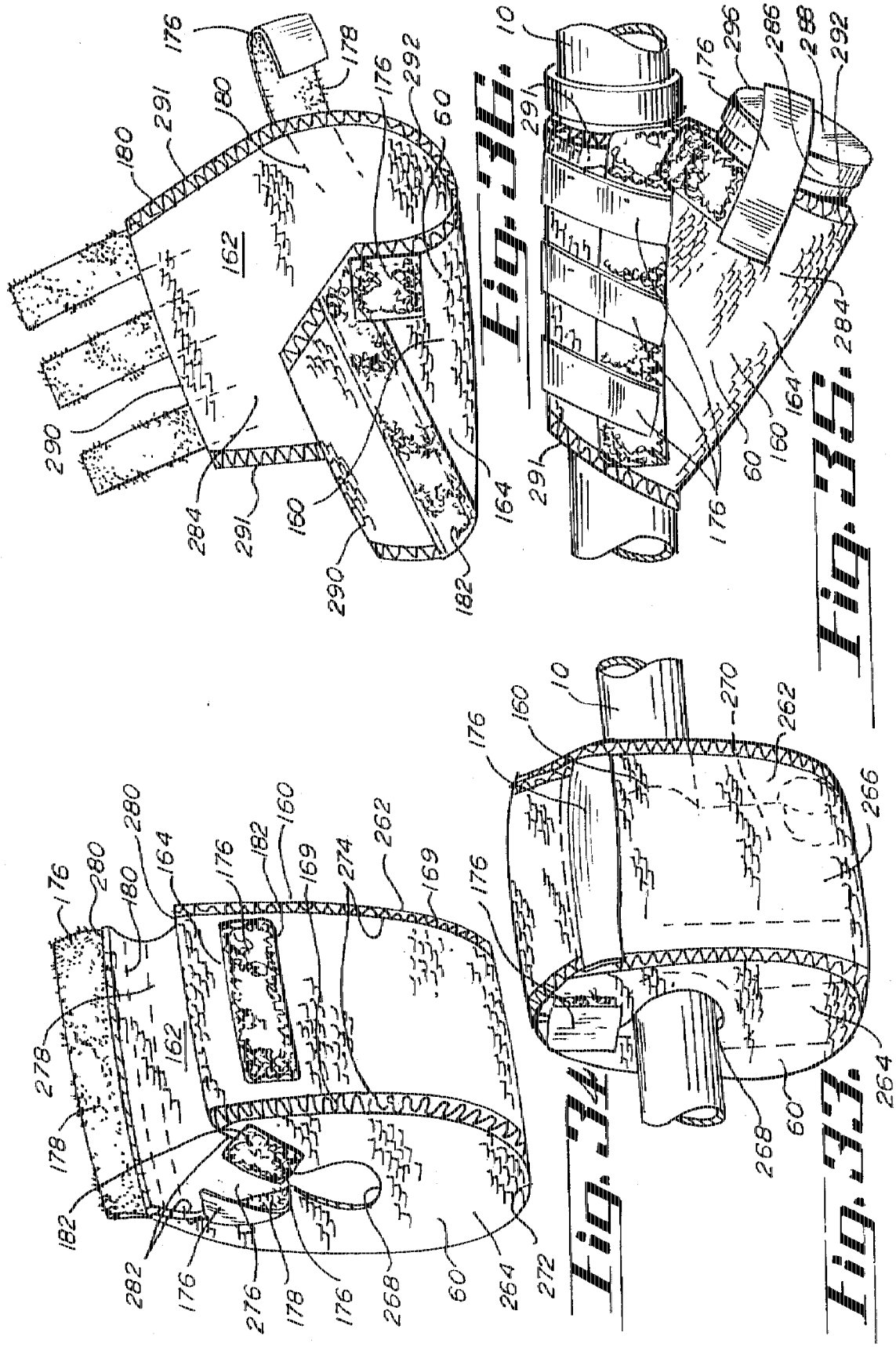

REUSABLE INSULATION JACKET FOR TUBING

BACKGROUND OF THE INVENTION

This invention a continuation-in-part of U.S. patent application Ser. No. 08/068,384 filed May 28, 1993 (U.S. Pat. No. 5,503,193), and U.S. patent application Ser. No. 08/099,943 filed Jul. 30, 1993 (abandoned).

This invention relates to an insulation jacket for tubing, and more particularly, to a reusable insulation jacket for tubing fittings and valves which convey steam, hot materials, condensate, lubricants, cryogenic fluids and cold materials typically used in heating and air conditioning, power facilities, food processing facilities and petrochemical facilities.

While cryogenic fluids approach absolute zero, steam for use in power may typically range between 270° F. and 300° F. These temperatures will easily burn an individual should they come in contact with either of these materials or the tubing, piping or conducting transporting such materials or steam.

Such extreme temperature steam and cold materials conveyed in tubing are common in industrial applications, such as boilers and petrochemical plants, and typically requiring insulation about the tubing. Asbestos is no longer used. While fiberglass insulation materials may indeed be used, known applications are generally not very sophisticated and require substantial installation time and further treatment for preservation of the insulation against weather, moisture and other harsh chemicals.

Consequently, preinsulated tubing has been developed and is commonly used as shown in prior art FIGS. 1 through 6. More specifically, the tubing 10 may be of a copper or steel for extremely high temperatures and aluminum or plastic for lower temperatures. Illustratively, tubing 10 may convey steam to a steam engine 12, which may be a boiler, tank or some other vessel. Tubing 10 is connected to the steam engine 12 by way of entrance fittings 14. It is common for the tubing 10 to be repeatedly spliced and reconnected by splice connectors 16. The source of the steam for tubing 10 may be a steam manifold 18. Controlling the steam into the tubing 10 may be done by way of a valve 20.

Preinsulated tubing 10 is commercially available from Parker-Hannifin Corporation of Ravenna, Ohio, marketed under the Paraflex Division. Such tubing 10 commonly has a preinsulation 24 thereover comprised of fiberglass layers 26 covered by a plastic jacket 28 which may be polyvinylchloride, polyethylene or the like. At the preinsulation end 30 emerges tubing 10.

A tube splice 34 is common and illustrated in prior art FIGS. 1 through 3. A tube splice 34 comprises tubing 10 extending from the preinsulation ends 30 and being joined by splice connectors 16. Commonly, a woven fiberglass sheet 36, with or without a self-sticking, plastic wrap-backing, is woven about the tube splice 34. Thereafter, a vinyl tape 38 may be wrapped around the tube splice 34 to seal the fiberglass sheet 36 in a waterproof manner.

In another arrangement, tube 10 may terminate in an end 44 appropriate for connection to a steam engine 12 by way of entrance fittings 14 shown in FIGS. 1 and 4 through 6. At the preinsulation end 30, commonly the fiberglass 26 is cut out 46 and filled in a sealing manner with uncured or unvulcanized silicone fill 48. After curing, a woven fiberglass tape 50 may be wrapped in spiral fashion around the tube 10 and secured by wire or tie fasteners 52. Thereafter, a thick waterproof latex paint, such as Mastik, may be painted over the fiberglass 50 as to waterproof and seal the fiberglass insulation 50.

These prior known methods of insulating tube splices and tube ends are extremely time consuming. Furthermore, the completed insulation and sealing of tube splices or tube ends becomes permanent and requires significant effort to again access the tubing.

There is a significant need for a reusable, easy-to-use fiberglass mat jacket that is presealed and which will readily cover tubing in an easy fashion in application and removal.

SUMMARY OF THE INVENTION

A reusable single layer insulation jacket for splicing and termination of industrial tubing, fittings and valves carrying extreme hot and cold materials comprises a fiberglass mat. The mat is of a width as to completely wrap the tubing, fitting or valve and overlap itself whereat complementary releasable fastening means securely hold the mat in place to insulate the tubing, fitting or valve from fire and to prevent an individual from otherwise being burned from contacting the tubing, fitting or valve.

A principal object and advantage of the present invention is that the reusable insulation jacket is simple to apply, easy to remove and furthermore reusable.

Another object and advantage of the present invention is that it may be used with bare tubing as well as in splicing and tube end protection of preinsulated tubing.

Another object and advantage of the present invention is that it is relatively inexpensive to manufacture and saves a significant amount of man hours in both application and reusable removal.

Another object and advantage of the present invention is the inside face overlaps the outside face to protect individuals and the fastening means from contacting the tubing.

Other objects and advantages will become obvious with the reading of the following specification and appended claims with a review of the Figures.

BRIEF DESCRIPTION OF THE DRAWINGS

FIG. 12 is the opposite side elevational view of the adaptor.

FIG. 13 is a front elevational view of the adaptor.

FIG. 14 is a rear elevational view of the adaptor.

FIG. 15 is a perspective view of the adaptor.

FIG. 16 is a perspective view of the adaptor fastened onto the preinsulated end of preinsulated robing.

FIG. 17 is a front elevational view of the adaptor and fiberglass mat or jacket secured in straight arrangement to the preinsulated tubing.

FIG. 18 is a cross-sectional view taken along lines 18—18 of FIG. 17.

FIG. 19 is a front elevational view of a preinsulated tube insulated and sealed by the fiberglass mat in spiral fashion together with the adaptor.

FIG. 21 is an inside out plan view of the elbow fitting jacket and fastening means.

FIG. 22 is an elevational view of a tubing, fitting and valve arrangement insulated and protected with the present invention.

FIG. 24 is an inside out plan view of the valve jacket and fastening means.

FIG. 25 is a perspective view of a T-fitting with the jacket fastened over the T-fitting.

FIG. 26 is a perspective view of the T-fitting jacket and fastening means.

FIG. 27 is a perspective view of a splice connector with the jacket fitted over the splice connector.

FIG. 28 is a perspective view of the splice connector jacket and fastening means.

FIG. 29 is a perspective view of an alternative embodiment of an elbow fitting jacket fitted over an elbow.

FIG. 30 is an open, non-attached perspective view of the elbow jacket.

FIG. 33 is a perspective view of a trap with the jacket fitted over the trap.

FIG. 34 is a perspective view of the trap jacket without the trap illustrating the stitching and fastening means.

FIG. 35 is a perspective view of a strainer with the jacket fitted over the strainer.

FIG. 36 is a perspective view of the strainer jacket illustrating the shape and fastening means.

DETAILED SPECIFICATION

Figure 1:
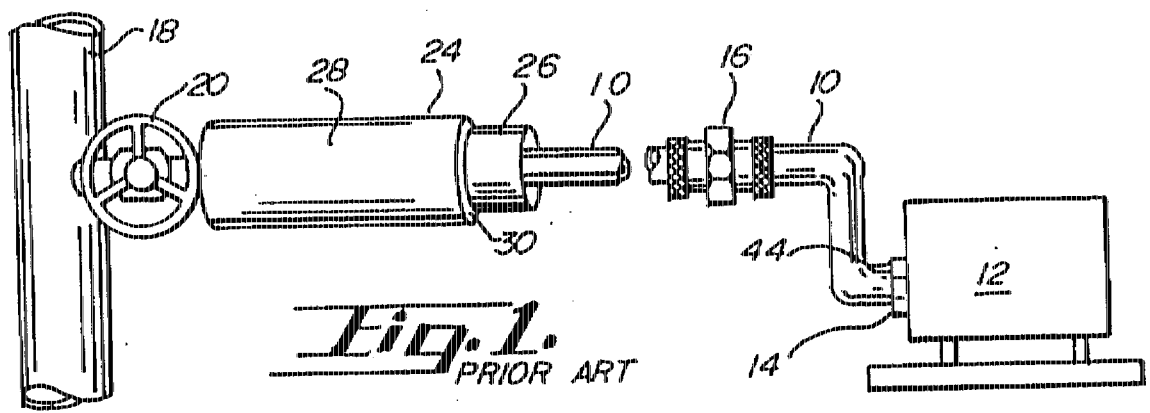
FIG. 1 is a partially schematic prior art view from a steam manifold to a steam engine.
Figure 2:
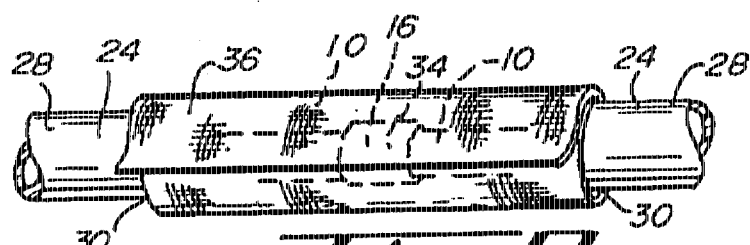
FIG. 2 is a front elevational prior art view of a partially spliced preinsulated tube.
Figure 3:
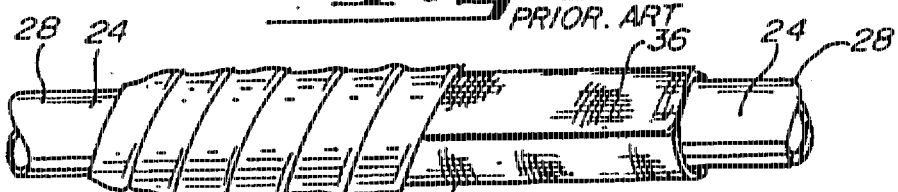
FIG. 3 is a front elevational prior art view of a nearly completed splice of preinsulated tubing.
Figure 4:
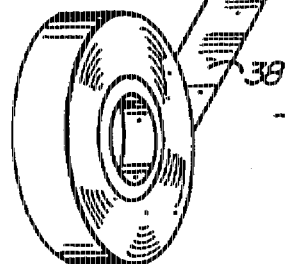
FIG. 4 is a perspective prior art view of a tube end of preinsulated tubing.
Figure 5:
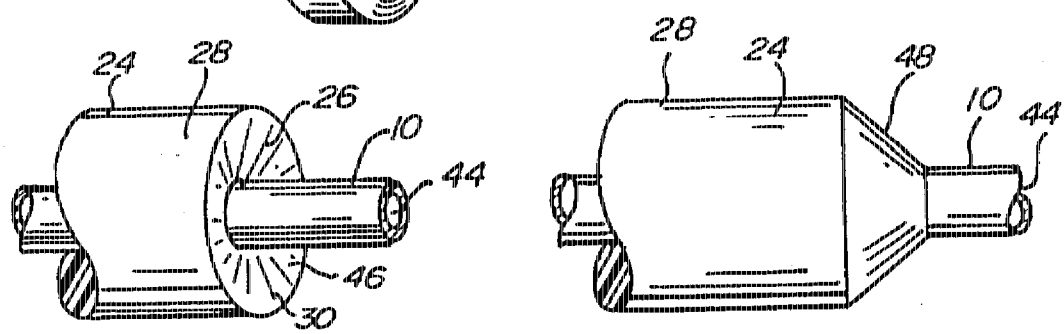
FIG. 5 is a front elevational prior art view of a partially sealed preinsulation end of a preinsulated tubing.
Figure 6:
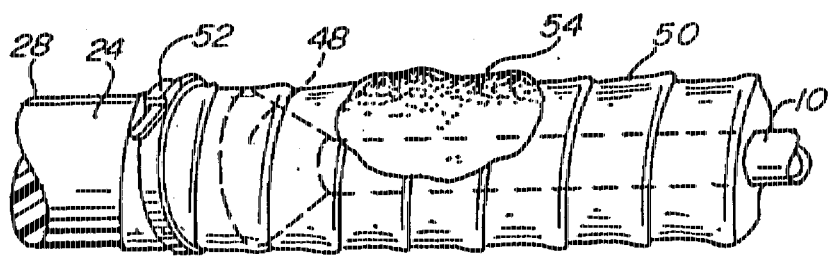
FIG. 6 is a front elevational prior art view of the tube end of a preinsulated tube spirally wrapped in insulation and partially sealed.
Figure 7:
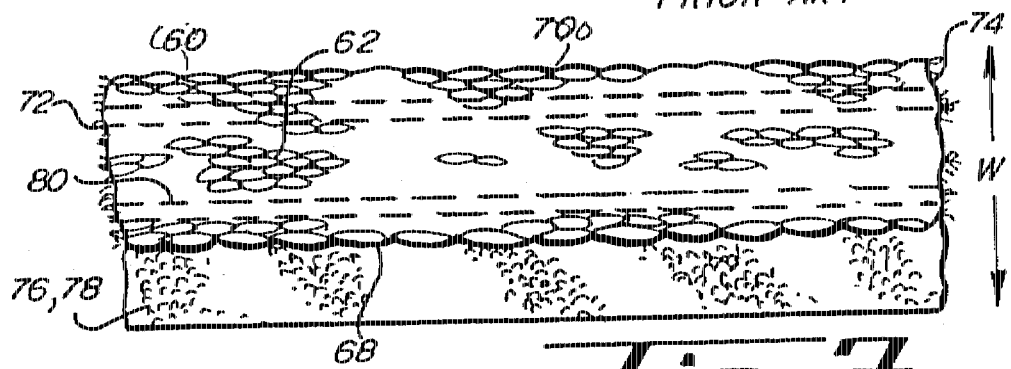
FIG. 7 is a front elevational view of the fiberglass jacket of the present invention.
Figure 9:
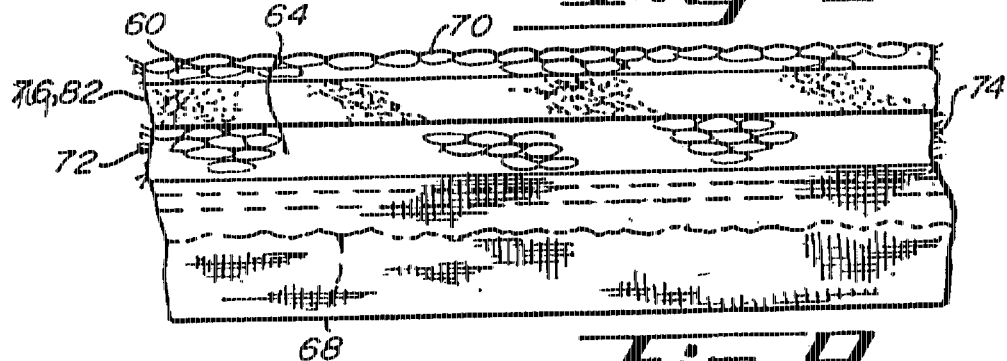
FIG. 9 is a rear elevational view of the fiberglass mat or jacket.
Figures 8, 10, 11:
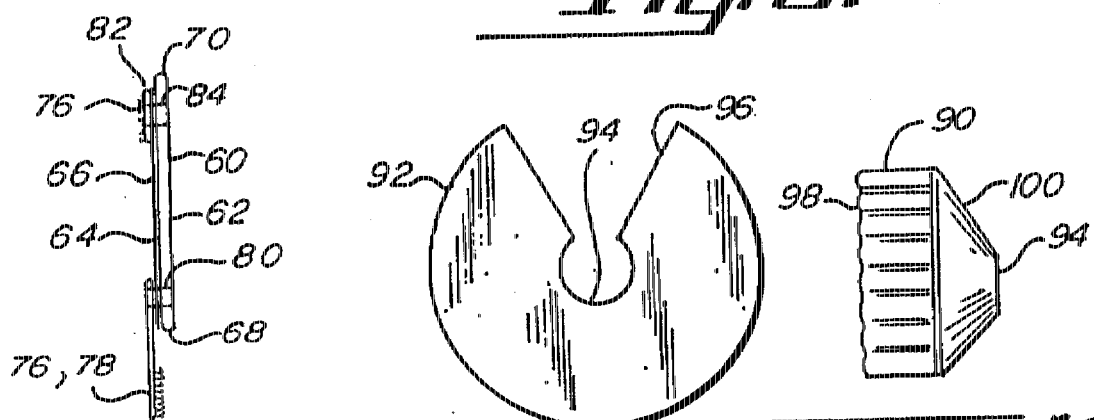
FIG. 8 is a side elevational view of the mat or jacket showing the fastening means in more detail together with a silicone sealing layer or coating.
FIG. 10 is a plan view of an aluminum blank for the frustum-shaped reducing adaptor of the present invention.
FIG. 11 is a side elevational view of the adaptor.

Referring to FIGS. 7 through 19, the fiberglass mat or jacket 60 together with the frustum-shaped reducing adaptor 90 may be seen and understood in construction and use in sealably insulating tubing splices and ends.

More specifically, the fiberglass fabric mat or jacket 60 illustratively may be on a roll approximating 3" wide and ¼" thick for ½" tubing 10. Please note that dimensions are for illustrative purposes only and are not to be deemed restrictive in interpretation. The mat 60 is used to form a one piece, single layer woven fabric polygard fiberglass tubing jacket 61 having an inside face 62 which will confront tube 10 and an outside face 64. Suitably the outside face 64 is sealed, such as with a silicone impregnate coating 66, to seal the fiberglass tubing jacket 61 from moisture, water and harsh chemicals. The fiberglass tubing jacket 61 has a first elongate side 68 and a second elongate side 70, and is suitably of a predetermined width (Arrow W) as previously described. Upon severing the mat 60 from a roll, it will then have a first short end 72 and an opposing second short end 74.

Fastening means 76 are suitably used with the invention. Applicant has found that hook and loop materials, such as Velcro, work well with this application. The hook material 78 is suitably affixed to the outside face 64 of the fiberglass tubing jacket 61 appropriately along the first elongate side 68 and held thereat appropriately by stitching 80. A second complimentary loop material 82 is also on the outside face 64 and suitably adjacent or close to the second elongate side 70 and held thereat by stitching 84. Advantageously, the loop material 82 is spaced inward somewhat from the second elongate side 70 as to assure that the fiberglass tubing jacket 61 will completely wrap around and overlap itself when insulating tubing 10. It should be understood the inside face 62 confronts outside face 64 when fiberglass tubing jacket 61 completely wraps around tubing 10 and overlaps itself (arrow O in FIG. 8).

The frustum-shaped reducing adaptor 90 is suitably made from an aluminum blank 92 which is punched to form the adaptor 90. The adaptor 90 has a central aperture 94 of a diameter only slightly larger than that of tubing 10. A pie slice 96 is removed from the blank 92 prior to punching to permit the adaptor blank to conform to its frustum shape. The adaptor 90 has a preinsulation engaging collar portion 98 which will readily fit over the preinsulation end 30. From the collar 98, the adaptor 90 has a necked-down or cone portion 100 and also has an overlapping portion 102 to assure a complete seal about the preinsulation end 30. The preinsulation end collar portion 90 appropriately may be secured to the preinsulation end 30 suitably by a tie 108 or a screw 110. Unvulcanized silicone (Arrow S) may be applied at the juncture of the preinsulation end 30 and collar portion 98 as shown, which will also secure the adaptor 90 to preinsulated end 30 after the silicone has become vulcanized or cured.

In insulating tube splices 34 and bare tubing 10, the fiberglass tubing jacket 61 may be utilized with or without the frustum-shaped reducing adaptor 90. Illustratively in FIGS. 16 through 19, the adaptor 90 is utilized. Initially, the adaptor 90 is fitted wherein tubing 10 extends through the central aperture 94 and the collar 98 is fitted over the preinsulation end 30. Unvulcanized silicone (Arrow S) may be utilized by application to the adaptor 90 at the collar 98 to preinsulated end 30 and at central aperture 94 where tubing 10 passes therethrough to cause a seal thereat after vulcanization or curing. A tie 108 or screw 110 may be utilized to temporarily or permanently secure the adaptor 90 in place. It may be seen that the hook material 78 of fastening means 76 overlaps loop material 82 to secure jacket 60 about tubing 10. Thereafter, the fiberglass tubing jacket 61 of a predetermined length may be wrapped in straight jacket fashion 112 shown in FIG. 17 with a small amount of unvulcanized silicone (Arrow S) may be applied to the short ends 72 and 74 of the fiberglass tubing jacket 61 at their juncture with tubing 10 to cause a seal thereat after vulcanization or curing. FIG. 18 clearly shows that the fiberglass tubing jacket 61 overlaps itself as to assure that the fastening means 76 do not come in contact with the extreme heated or chilled tubing 10.

Alternatively, FIG. 19 shows that the fiberglass mat or jacket 60 may appropriately be spiral wrapped 114. Although this arrangement is possible, it does consume greater lengths of jacket 60 as opposed to the straight jacket fashion 112. It may be seen that the hook material 78 of fastening means 76 overlaps loop material 82 to secure jacket 60 about tubing 10.

Referring to FIGS. 20–24, 35 and 36, the fiberglass jacket or mat 60 may be seen as a one piece single layer woven fiberglass fabric mat which takes another shapes as a polygonal fiberglass jacket 160. The fiberglass jacket 160 is generally polygonal in shape and has greater than three sides. However, the polygonal fiberglass jacket 160 is rectangular in FIG. 22 over splice connectors 16 (not shown, but covered).

More specifically, the single layer fiberglass jacket 160 is flexible and has an inside face 162 and an outside face 164 with the optional silicone coating 66 as previously discussed. FIGS. 21 and 24 show the jacket 160 in an inside-out condition 167 where the outside face 164 is folded upon itself and the inside face 162 is directed outwardly. Stitching 169 is then made in the folded jacket 160. After the stitching 169 is completed, the fiberglass jacket 160 is then inverted to its outside-out condition 171 clearly shown in FIGS. 20 and 23. Along the elongate peripheral edge 173 of the jacket 160 are located fastening means 176 which suitably may be hook material 178 fastened thereat by stitching 180 and loop material 182 attached thereat appropriately by stitching 184.

Figure 20:
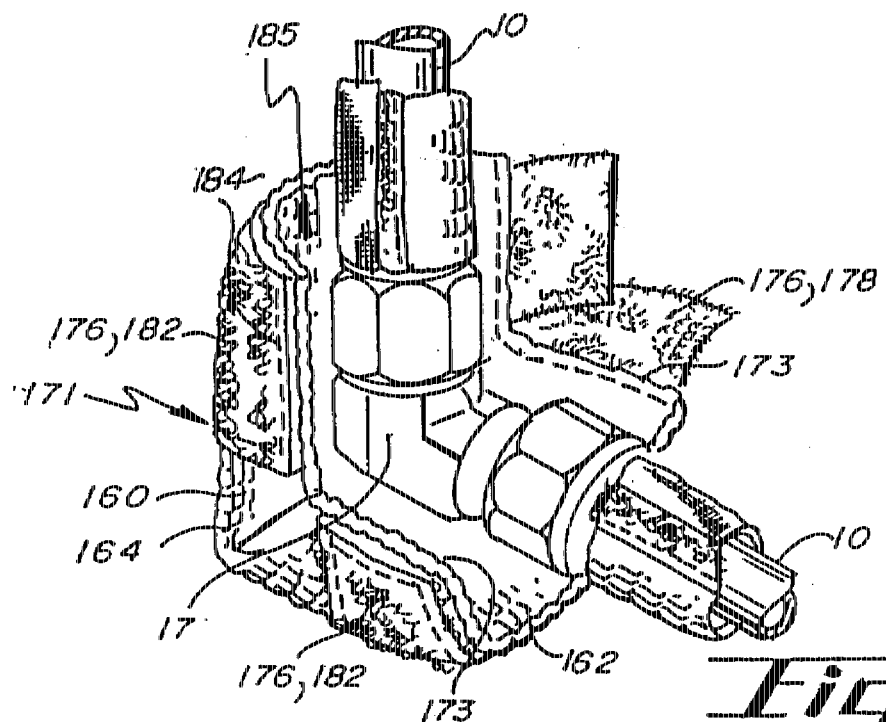
FIG. 20 is a perspective view of an elbow fitting with the jacket and fastening means beginning to be fitted over the elbow.
Figure 23:
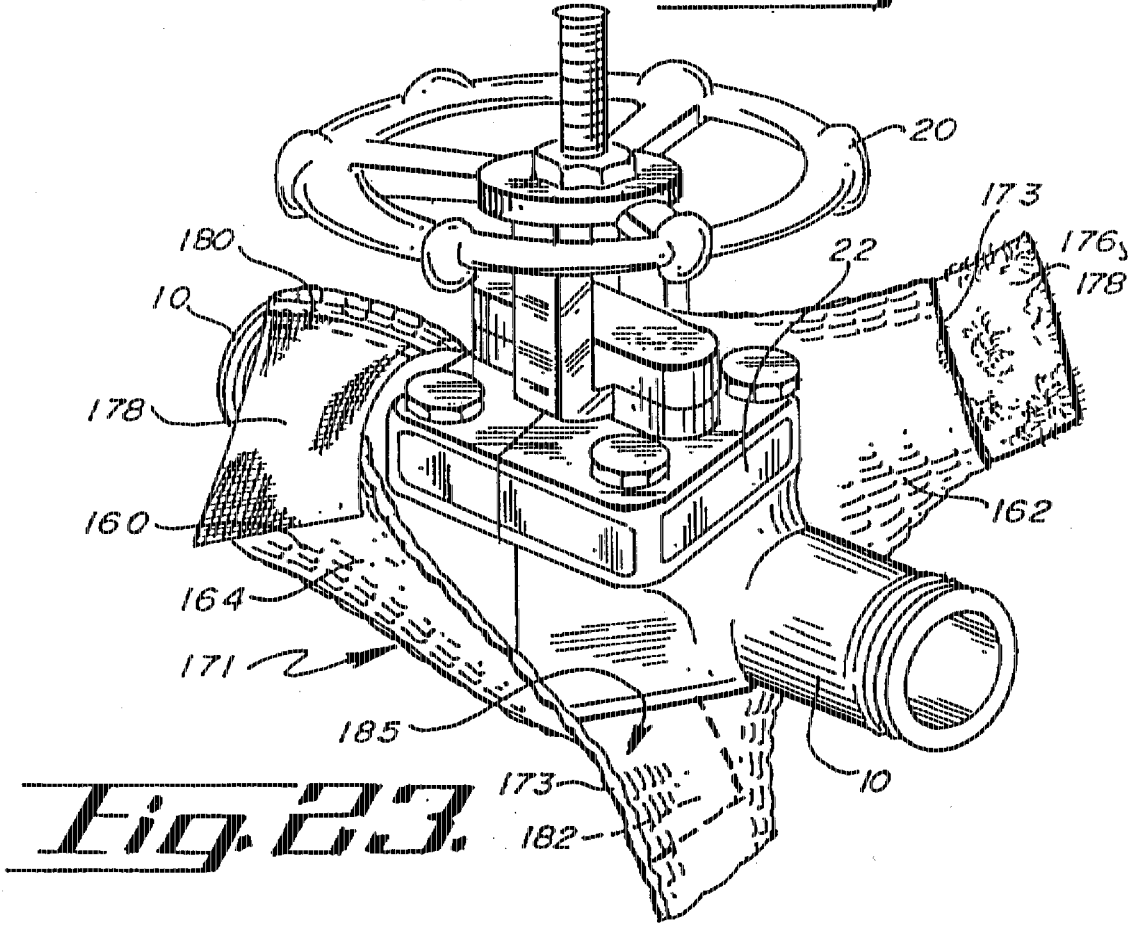
FIG. 23 is a perspective view of a valve with the jacket and fastening means beginning to be fitted over the valve body.

After the jacket 160 is inverted from its inside-out condition 167 to its outside-out condition 171, a cavity 185 is formed and the width of the polygonal fiberglass jacket 160 which will now permit the overlapping alignment of the hook and loop materials 178 and 182. Thereafter, as shown in FIGS. 20 and 23, the inside face 162 may be brought up to confronting relationship, while the cavity wraps around the elbow splice connector 17 or the valve body 22 of the valve connector 20.

The jacket 160 actually overlaps itself somewhat and thereafter the fastening means 176 are releasably secured to securely insulate the connectors 17 and 20 with the fiberglass mat or jacket 160 from fire and to prevent an individual from otherwise being burned from contacting the connectors 17 and 20. The polygonal fiberglass jacket 160 may be removed by simply peeling away of the hook material 178 from the loop material 182.

Referring to FIGS. 25–34, the single layer, flexible, woven fabric fiberglass jacket or mat 60 may be seen to take additional shapes for the woven fabric, flexible polygonal single layer fiberglass jacket 160 where each additional polygonal fiberglass jacket 160 has an inside face and outside face with the optional silicon coating as previously discussed. In general, two sections of fiberglass jacket or mat 60 are placed having the outside face directed inwardly and the inside face directed outwardly. Stitching 169 is then made in both sections of the fiberglass jacket or mat 60 along one or more adjoining edges. After the stitching 169 is completed, the fiberglass jacket 160 is then inverted to its outside-out condition for the formation of a cavity surrounded by the inside face of the single layer fiberglass jacket 160 which permits the overlapping alignment inside face over the outside face of the single layer fiberglass jacket 160.

Referring to FIGS. 25 and 26, the polygonal fiberglass jacket 160 may be seen to take another shape such as the T-fitting fiberglass jacket 230. The T-fitting fiberglass jacket 230 is generally cylindrical in shape having two opposing elongate edges 231. Each opposing elongate edge 231 having a centrally-positioned portion 232 which is adapted to surround the base of the perpendicular section 240 of a T-fitting 234. As seen in FIGS. 25 and 26, the T-fitting jacket 230 includes two ends 236, an inside face 162, and an outside face 164 with the optional silicon coating as previously described. The T-fitting fiberglass jacket 230 additionally includes a pair of fastening means 176 which are generally positioned proximate to, and between, the ends 236 and the opposing centrally-positioned wrap-around portions 232 and spaced from centrally-positioned wrap-around portions 232 to allow overlap. The fastening means 176 may suitably be hook material 178 fastened to the T-fitting fiberglass jacket 230 by stitching 180 adjacent one end 236 and loop material 182 attached to the T-fitting fiberglass jacket 230 appropriately by stitching 180 adjacent the other end 236.

The tubular shape and the width of the T-fitting jacket 230 form a cavity for surrounding the T-fitting 234 and permits the overlapping alignment of the hook and loop materials 178 and 182. The inside face 162 may be brought up to a confronting relationship with the perpendicular section 240 at opposing centrally-positioned portions 232, while the T-fitting jacket 230 wraps around the T-fitting 234 for engagement to the outside face 164 during affixation of the fastening means 176.

The T-fitting jacket 230 actually overlaps itself somewhat and thereafter the fastening means 176 are releasably secured to securely insulate the T-fitting 234 from fire and to prevent an individual from otherwise being burned by contact with the T-fitting 234. The T-fitting jacket 230 may be removed by simply peeling away of the hook material 178 from the loop material 182.

Referring to FIGS. 27 and 28, the polygonal fiberglass jacket 160 may be seen to take another shape such as the expanded tubular jacket 220. The expanded tubular jacket 220 is generally shaped to enclose and cover an enlarged splice connector 16 having an enlarged central collar connector (not shown). As seen in FIG. 27, the expanded tubular jacket 220 is generally formed of two pieces of fiberglass mat or jacket 60 longitudinally connected at adjoining edges 222 by stitching 169 through both pieces of fiberglass mat 60. The expanded tubular jacket 220 additionally includes two ends 221 and an outside face 208 having optional silicon coating as previously discussed.

As seen in FIG. 27, the expanded tubular jacket 220 has a width sufficient to be wrapped around a splice connector 16 having an enlarged central collar connector (not shown). Along the two opposing elongate peripheral edges 223 of the expanded tubular jacket 220 are located fastening means 176 spaced inwardly from at least one opposing elongate peripheral edge 223 which may be suitably hook material 178 fastened to one opposing elongate peripheral edge 223 by stitching 180 and loop material 182 attached to the other opposing elongate peripheral edge 223 appropriately by stitching 180. Upon positioning of the expanded tubular jacket 220 over the splice connector 16 the inside face 162 may be brought up to confronting relationship over the outside face 208 for mating of the hook material 178 to the loop material 182 while overlapping the inside face 162 over the outside face 208 intermediate the opposing elongate peripheral edge 223 and fastening means 176.

The expanded tubular jacket 220 actually overlaps itself somewhat and thereafter the fastening means 176 may be releasably secured to securely insulate the splice connector 16 to insult from fire and to prevent an individual from otherwise being burned during contact with the connector 16. The expanded tubular jacket 220 may be easily removed by simply peeling away the hook material from the loop material 182.

Referring to FIGS. 29-30, the polygonal fiberglass jacket 160 may be seen to take another shape such as the single layer, woven fabric elbow fitting fiberglass elbow jacket 200. The fiberglass elbow jacket 200 is generally shaped to enclose and cover an enlarged elbow splice connector 117. As seen in FIGS. 29-30, the elbow splice connector 117 includes a pair of tubing sections 10 joined at an angle.

The fiberglass elbow jacket 200 has an inside face 206 and an outside face 208. The fiberglass elbow jacket 200 includes a pair of laterally joined collar covering sections 210 of fiberglass mat 60 having stitching running intermediate the two ends 216. Both collar covering sections 210 have an optional silicon coating on the outside face 208, as previously discussed. The collar covering sections 210 each include adjoining edge portion 214. Stitching 169 through the collar covering sections 210 at the adjoining edge portions 214 connects the collar covering sections 210 to each other for the provision of forming an expanded polygonal jacket 200 having a width sufficient to flushly enclose an elbow splice connector 117 in a cavity bounded by the inside face 206.

As seen in FIGS. 29 and 30, the fiberglass elbow jacket 200 is partially wrapped around and fitted upon an elbow splice connector 117. The expanded polygonal jacket 200 includes opposing elongate peripheral sides 215 which in turn include the fastening means 176 spaced inwardly from opposing elongate peripheral sides 215 and ends 216. The fastening means 176 may suitably be hook material 178 fastened adjacent one of the opposing elongate peripheral sides 215 by stitching 180 and loop material 182 attached adjacent the opposite opposing elongate peripheral sides 215 appropriately by stitching 180. Upon alignment of the expanded polygonal jacket 200 over the elbow splice connector 117, the inside face 206 may be brought up to confronting relationship with outside face 208 and elbow splice connector 117 for mating of the hook material 178 to the loop material 182.

The fiberglass elbow jacket 200 actually overlaps itself and therefore the fastening means 176 may be releasably secured to securely insulate the elbow splice connector 17 from fire and to prevent an individual from otherwise being burned during contact with the connector 17. The fiberglass elbow jacket 200 may be easily removed by simply peeling away the hook material 178 from the loop material 182.

Figure 32:
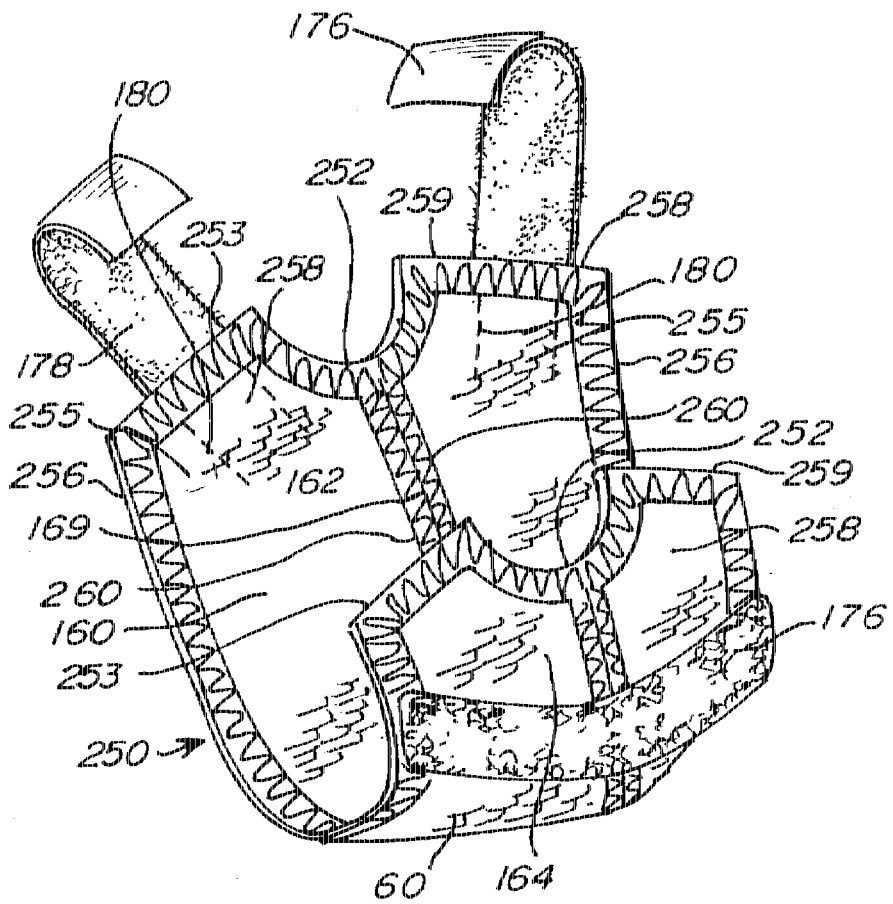
FIG. 32 is an open unattached perspective view of the alternative valve jacket of FIG. 31.
Figure 31:
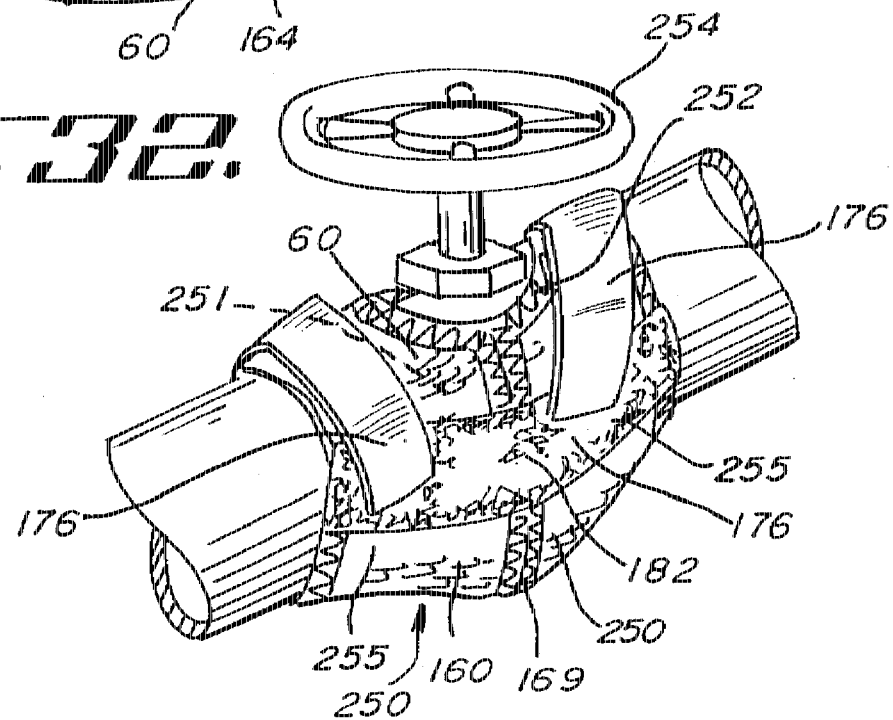
FIG. 31 is a perspective view of a valve with an alternative valve jacket fitted over the valve.

Referring to FIGS. 31 and 32, the woven fabric, single layer polygonal fiberglass jacket 160 may be seen to take on another shape such as the alternative embodiment of a woven fabric single layer valve fitting fiberglass jacket 250. The valve fitting fiberglass jacket 250 is generally cylindrical in shape having a width sufficient to surround the valve 251 and opposing, elongate edges 253 comprising mirror-image, centrally-positioned cutaway portions 252 which are adapted to surround the base of the valve actuator 254.

As seen in FIGS. 31 and 32, the valve fitting fiberglass jacket 250 includes a pair of longitudinally joined sections 255, an inside face 162 and an outside face 164 with the optional silicon coating as previously described. The opposing elongate edges 253 additionally include a pair of affixation areas 258 adjacent the mirror-image centrally-positioned cutaway portion 252. A fastening means 176 is fastened along opposing elongate edges 253 with stitching 180. The fastening means 176 may be fastened approximate to, and between, the ends 256 and the mirror-image centrally-positioned cutaway portions 252.

The fastening means 176 is spaced inwardly from the opposing elongate edges 253 to allow for overlap. The fastening means 176 may suitably be of material 178 fastened to the valve fitting fiberglass jacket 250 by stitching 180 and loop material 182 attached to the valve fitting fiberglass jacket 250 appropriately by stitching 180. As illustrated in FIG. 32, loop material 182 may be fastened to valve fitting fiberglass jacket 250 in a spaced relation from one opposing elongate edge 253 to allow for overlap.

The tubular shape of the valve fitting fiberglass jacket 250 permits the overlapping alignment of the hook and loop materials 178 and 182. The inside face 162 may be brought up to a confronting relationship with the valve (not shown) and outside face 164 for engagement of the fastening means 176.

The valve fitting fiberglass jacket 250 comprises two fiberglass jacket or a mat 60 pieces which may be placed having the outside face 164 directed inwardly and the inside face 162 directed outwardly. Stitching 169 is then made into fiberglass jacket or mat 60 along the adjoining edge portions 260. After the stitching is completed, the valve fitting fiberglass jacket 250 is then inverted to its outside-out condition for the formation of a cavity which surrounds the valve (not shown) and permits the overlapping alignment of the affixation areas 258 permitting the mirror-image centrally-positioned cutaway portions 252 to surround valve actuator 254. The valve fitting fiberglass jacket 250 actually overlaps itself somewhat at the affixation areas 258 and thereafter the fastening means 176 may be releasably secured to securely insulate the valve (not shown) to insulate from fire and to prevent an individual from otherwise being burned during contact with the valve. The valve fitting fiberglass jacket 250 may be easily removed by simply peeling away the hook material 178 from the loop material 182.

Referring to FIGS. 33 and 34, the polygonal fiberglass jacket 160 may be seen to take another shape such as a single layer woven fabric trap fiberglass jacket 262. The trap fiberglass jacket 262 is generally pocket shape having two end covers 264 and a central covering section 266 joined by stitching 169 and defining the cavity. The trap fiberglass jacket 262 comprises an inside face 162, an outside face 164 and an optional silicon coating as previously discussed. The end covers 264 have an inside face 162, an outside face 164 and a hole 268 for allowing the tubing 10 to pass through the trap fiberglass jacket 262. The end covers 264 comprise outer edges 272 and end opening 276. End opening 276 extends from outer edge 272 to hole 268 to permit tubing 10 to be slid into hole 268 through trap opening 278 and end opening 276. In addition, end opening 276 has opposing edge portions 282 along which are fastened fastening means 176 on the outside face 162 of the end covers 264.

The central covering section 266 is adapted to surround the trap 270 as shown in FIG. 33. Central covering section 266 comprises an inside face 162, an outside face 164, opposing elongate sides 280 and end edge portions 274 which are attached to the outer edge 272 of the end covers 264 by stitching 169. The fiberglass jacket 262 is assembled with one end cover 264 attached to each end edge portion 274 of the central covering section 266. The central covering section 266 is attached having one opposing elongate side 280 aligned with one opposing edge portion 282 both attached edge end covers 264. The central covering section 266 has a width sufficient to extend completely around end cover 264 having the second opposing elongate side 280 extending up to or slightly overlapping the second opposing edge portion 282 of both end covers 264. It should be understood, each end cover 264 is attached having the opposing elongate sides 280 of the central covering section 266 attached to the end cover 264 adjacent the end opening 276 of the end cover 264. This assembly creates a trap opening 278 which extends from the hole 268 and the end opening 276 of one end cover 266, between the opposing elongate sides 280 of the central covering section 266 and through the end opening 276 and hole 268 of the second end cover 264. It should be understood, holes 268 in each end cover 264 may be coaxial to each other to allow the tubing 10 to pass through the trap fiberglass jacket 262. Trap opening 278 has opposing elongate sides 280 along which are located fastening means 176 on the outside face 162 of the central covering sections 266 and spaced inwardly from opposing elongate sides 280. Fastening means 176 may suitably be hook material 178 fastened to the outside face of the trap fiberglass jacket 262 by stitching 180 and loop material 182 attached to the trap fiberglass jacket 262 appropriately by stitching 180.

To attach to trap fiberglass jacket 262, the trap 270 is inserted into the trap opening 278. Tubing 10 attached to trap 270 is guided into trap opening 278 and along end opening 276 into hole 268. Fastening means 176 along end opening 276 is used to bring end opening edges 282 together to be held in place by fastening means 176 and enclose tubing 10 in hole 268. Opposing elongate sides 280 are brought together to close trap opening 278 and position inside face 162 into a confronting relationship with the trap 270 and outside face 164 for engagement to the outside face 164 by fixation of the fastening means 176.

The trap fiberglass jacket 262 actually overlaps itself somewhat along the top opening 278 and thereafter the fastening means 176 are releasably secured to securely insulate the trap 270 from fire and to prevent an individual from otherwise being burned by contact with the trap 270. The trap fiberglass jacket 262 may be removed by simply peeling away the hook material 178 from the loop material 182.

Referring to FIGS. 35 and 36, the polygonal fiberglass jacket 160 may be seen to take another shape such as the one piece, single layer, woven fabric, polygonal strainer fiberglass jacket 284. The strainer fiberglass jacket 284 is generally shaped to enclose and cover an enlarged strainer 286 having an angularly attached strainer body 288. As seen in FIG. 35, the strainer fiberglass jacket 284 is generally formed of one piece polygonal fiberglass jacket or mat 60 having angularly cut edges to form two opposing elongate sides 290 and ends 291 provide for an insulating cover over tube 10 and shaped to accommodate the angularly extending strainer portion 288. The strainer fiberglass jacket 284 additionally includes an outside face 164, an inside face 162 and a optional silicon coating as previously discussed on the outside face 164.

Referring to FIGS. 35 and 36, the strainer fiberglass jacket 284 includes a pair of peripheral opposing elongate sides 290 which are formed from the fiberglass mat or jacket 60 to be opposing when wrapped around the strainer 286. Fastening means 176 is positioned laterally along and inwardly spaced from opposing elongate sides 290 to allow overlap of the inside face 162 over the outside face 164.

The strainer fiberglass jacket 284 also comprises a strainer edge 292. Fastening means 176 is attached at two places along the strainer edge 292. A strip of hook material 178 is attached at one position along the strainer edge 292 and complimentary loop material 182 is attached at another fastening means position along strainer edge 292. When strainer fiberglass jacket 284 is wrapped around strainer 286, strainer edge 292 wraps around angularly extending strainer portion 288. Fastening means along strainer edge 292 extends over the end of strainer 296 and releasably attaches to loop material 182 along strainer edge 292. This prevents strainer fiberglass jacket 284 from sliding longitudinally along tubing 10.

The strainer fiberglass jacket 284 actually overlaps itself somewhat along opposing elongate sides 290 and thereafter the fastening means 176 may be releasably secured to securely insulate the strainer 286 to insulate from fire and to prevent an individual from otherwise being burned during contact with the strainer 286. The strainer fiberglass jacket 284 may be easily removed by simply peeling away the hook material 178 from the loop material 182.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

I claim:

1. A reusable single layer insulation jacket for tubing comprising straight tubing, tubing elbows, T-fittings, splice connectors, valve connectors, trap or strainers which conveys steam, hot materials, condensate, lubricants, cryogenic fluids and cold materials typically used in heating and air conditioning, power facilities, food processing and petrochemical facilities, the insulation jacket comprising:

(a) a reusable, polygonal single layer, flexible fiberglass fabric mat having an inside face, an outside face, and two opposing edges, the outside face impregnated silicone; and (b) complementary releasable fastening means fastened on the outside face along one opposing edge and slightly inward of the other opposing edge as to permit the inside face of the fabric mat to confront and wrap around the tubing and the outside face and to releasably interlock the fastening means for securely holding the mat around the tubing so that the mat insulates the tubing and prevents an individual from being burned from contacting the otherwise exposed tubing.

2. The insulation jacket of claim 1, wherein the fastening means comprises complementary hook and loop materials.

3. The invention of claim 2 wherein the complementary hook and loop material is fastened by stitching.

4. The insulation jacket of claim 1, further comprising a silicone sealant placed on the mat ends adjacent the tubing.

5. The invention of claim 1 further comprising a strainer edge having complementary reusable fastening means fastened thereon.

6. In a reusable single layer flexible insulation jacket assembly for tubing comprising straight tubing, tubing elbows, T-fittings, splice connectors, valve connectors, trap or strainers which convey steam, hot materials, condensate, lubricants, cryogenic fluids and cold materials typically used in heating and air conditioning, power facilities, food processing and petrochemical facilities, the insulation jacket assembly comprising:

(a) two polygonal single layer, fiberglass fabric mats, each fiberglass fabric mat having an inside face, an outside face, an opposing edge and an adjoining edge and a width, the fiberglass fabric mats connected to each other by stitching along and through the adjoining edge portions of each fiberglass fabric mat, the outside face impregnated with silicone; and (b) complementary releasable fastening means fastened on the outside face along one opposing edge and slightly inward of the other opposing edge so that the inside face confronts and overlaps the outside face forming a cavity bounded by the inside face that covers the tubing and one opposing edge overlaps the other opposing edge and the fastening means will releasably interlock for securely holding the mat around the tubing so that the mat insulates the tubing and prevents an individual and the fastening means from being burned while the silicone seals the mat from moisture, water and harsh chemicals.

7. The insulation jacket of claim 6, wherein the fastening means comprises complimentary hook and loop materials.

8. The invention of claim 6 wherein the adjoining edge portion of one fiberglass fabric mat is placed adjacent the adjoining edge portion of the other fiberglass fabric mat, the outside face of each fiberglass fabric mat facing inwardly toward each other in an outside face in condition, after stitching the fiberglass fabric mat invented to an outside face out condition forming the cavity bounded by the inside face.

9. The invention of claim 6 wherein the fiberglass fabric mats are joined by stitching intermediate the opposing edges joining the pieces longitudinally.

10. The invention of claim 6 wherein the fiberglass fabric mats are joined by stitching intermediate the ends joining the pieces laterally.

11. A reusable single layer flexible fiberglass jacket for insulating tubing comprising straight tubing, tubing elbows, T-fittings, splice connectors, valve connectors, trap or strainers which convey steam, hot materials, condensate, lubricants, cryogenic fluids and cold materials typically used in heating and air conditioning, power facilities, food processing and petrochemical facilities, the insulation jacket comprising:

(a) a sealed woven fiberglass mat having two ends, a width, an inside face, an outside face, a plurality of opposing edges and a cavity bounded by the inside face; and (b) complementary releasable fastening means fastened on the outside face along one opposing edge of the woven fiberglass mat and slightly inward of another opposing edge of the woven fiberglass mat so that the inside face of the woven fiberglass mat confronts and wraps around the tubing wherein the width is sufficient so that the woven fiberglass mat overlaps the tubing and one opposing edge of the fiberglass mat overlaps the other opposing edge and the fastening means on the outside face of the woven fiberglass mat do not touch the tubing and will releasably interlock for securely holding the woven fiberglass mat around the tubing so that the woven fiberglass mat insulates the tubing and prevents an individual from being burned from contacting the otherwise exposed tubing and seals the woven fiberglass mat from moisture, water and harsh chemicals.

12. The invention of claim 11 wherein the two of the opposing edges of the woven fiberglass mat further comprise:

(a) a centrally-positioned portion on each opposing edge, the fastening means attached to the woven fiberglass mat by stitching through the woven fiberglass mat; and (b) the complementary releasable fastening means fastened to the woven fiberglass mat along one opposing edge intermediate to the centrally-positioned portion and each end as to permit the inside face to confront the outside face of the woven fiberglass mat adjacent to the centrally-positioned portion, and the cavity to surround the tubing to permit the fastening means to releasably interlock to securely insulate the tubing from fire and to prevent an individual from otherwise being burned when contacting the tubing.

13. The invention of claim 12 further comprising a cutaway edge on each centrally positioned portion, the fastening means on one opposing edge attached intermediate to the cutaway edge and each end.

14. The invention of claim 12 further comprising affixation areas on the outside face of the woven fiberglass mat adjacent the ends, stitching through the fastening means and the woven fiberglass mat to fasten the fastening means on the affixation areas.

15. The invention of claim 11 wherein the of woven fiberglass mat further comprises a plurality of woven fiberglass sections, each woven fiberglass section having an adjoining edge, an opposing edge on at least one of the woven fiberglass sections, the sections joined by stitching along the adjoining edge and through the woven fiberglass sections.

16. The invention of claim 11 the end further comprising:

(a) an end cover having an outside face, an inside face, an outer edge and a hole spaced from the outer edge, an end opening extending from the outer edge of the end cover to the hole, the end opening having two opposing edge portions, releasable fastening means on the outside face of the end cover adjacent to each opposing edge portion;

(b) a central covering section having an inside face, an outside face, two end edge portions and opposing elongate sides;

(c) a pocket defined by the central covering section attached to the end covers, one end edge portion of the central covering section attached to each end cover along the outer edge of the end cover by stitching, each elongate side positioned adjacent one opposing edge portions of the end cover, the holes of each end cover positioned coaxial to each other; and (d) a trap opening bounded by the two elongate sides, the opposing edge portions of both end openings and the two holes in the end covers, the releasable fastening means on the outside face of the central covering section adjacent to and spaced from the opposing elongate sides as to permit the inside face of the central covering section adjacent to an opposing elongate side of the central covering section to confront the outside face of the central covering section adjacent to the other opposing elongate side of the central covering section and the hole of each end cover to be repeated from the outer edge of the end cover by the releasable fastening means on the outside face adjacent to the opposing edge portion of the end cover interlocking, the releasable fastening means on the central covering section and each end cover interlocked to securely insulate the tubing.

* * * * *